United States Patent
Patel et al.

(10) Patent No.: US 10,020,025 B2
(45) Date of Patent: Jul. 10, 2018

(54) METHODS AND SYSTEMS FOR CUSTOMIZING IMMERSIVE MEDIA CONTENT

(71) Applicant: Zeality Inc., Pleasanton, CA (US)

(72) Inventors: Dipak Mahendra Patel, Pleasanton, CA (US); Arlene Joy Ganancial Santos, Martinez, CA (US); Scott Riley Collins, Oakland, CA (US); Bryan Daniel Bor, Concord, CA (US); Adam Mark Dubov, Berkeley, CA (US); Timothy George Harrington, II, San Jose, CA (US)

(73) Assignee: Zeality Inc., Pleasanton, CA (US)

( * ) Notice: Subject to any disclaimer, the term of this patent is extended or adjusted under 35 U.S.C. 154(b) by 157 days.

(21) Appl. No.: 15/284,330

(22) Filed: Oct. 3, 2016

(65) Prior Publication Data

US 2018/0025752 A1  Jan. 25, 2018

Related U.S. Application Data

(63) Continuation-in-part of application No. 15/217,961, filed on Jul. 22, 2016.

(51) Int. Cl.
*G11B 27/00* (2006.01)
*H04N 5/93* (2006.01)
(Continued)

(52) U.S. Cl.
CPC ............ *G11B 27/036* (2013.01); *G06F 3/011* (2013.01); *G06F 3/04845* (2013.01);
(Continued)

(58) Field of Classification Search
None
See application file for complete search history.

(56) References Cited

U.S. PATENT DOCUMENTS

2007/0208766 A1* 9/2007 Malik ................. G11B 27/034
2012/0222057 A1  8/2012 Sadowsky et al.
(Continued)

FOREIGN PATENT DOCUMENTS

WO  WO2016/050283 A1  4/2016

OTHER PUBLICATIONS

Zeality Inc., International Search Report and Written Opinion, PCT/US2017/043369, dated Nov. 27, 2017, 25 pgs.

*Primary Examiner* — Heather Jones
(74) *Attorney, Agent, or Firm* — Morgan, Lewis & Bockius LLP

(57) ABSTRACT

A computing system has memory, a microphone, and an image sensor. A process displays an immersive media customization user interface, and plays a 360 video. In response to a first user action, the process captures a freeze frame of the 360 video at a specific moment. In response to a second user action, the process starts recording a customized video of the captured freeze frame in real time according to a dynamically adjustable visibility window of the captured freeze frame. While recording the customized video, a user adjusts the visibility window. After recording, a user annotates the customized video, including one or more of: adding a visual overlay in a portion of the customized video, where the visual overlay is a recorded video of the user; adding an audio overlay (e.g., user comments); and adding text or an image. The process transmits the customized video to another computing system.

20 Claims, 15 Drawing Sheets

(51) Int. Cl.
*G11B 27/036* (2006.01)
*H04N 9/87* (2006.01)
*G06F 3/16* (2006.01)
*G06F 3/01* (2006.01)
*G06F 3/0484* (2013.01)
*H04N 5/77* (2006.01)
*G11B 27/32* (2006.01)
*H04N 5/232* (2006.01)

(52) U.S. Cl.
CPC .......... *G06F 3/04847* (2013.01); *G06F 3/167* (2013.01); *G11B 27/32* (2013.01); *H04N 5/23238* (2013.01); *H04N 5/77* (2013.01); *H04N 9/8715* (2013.01)

(56) References Cited

U.S. PATENT DOCUMENTS

| | | |
|---|---|---|
| 2013/0014142 A1 | 1/2013 | Newell |
| 2014/0115649 A1 | 4/2014 | Kim et al. |
| 2014/0325549 A1 | 10/2014 | Sillerman |
| 2015/0208020 A1* | 7/2015 | Castiglione .............. H04N 5/76 386/240 |
| 2015/0262423 A1 | 9/2015 | Heinz, II et al. |

* cited by examiner

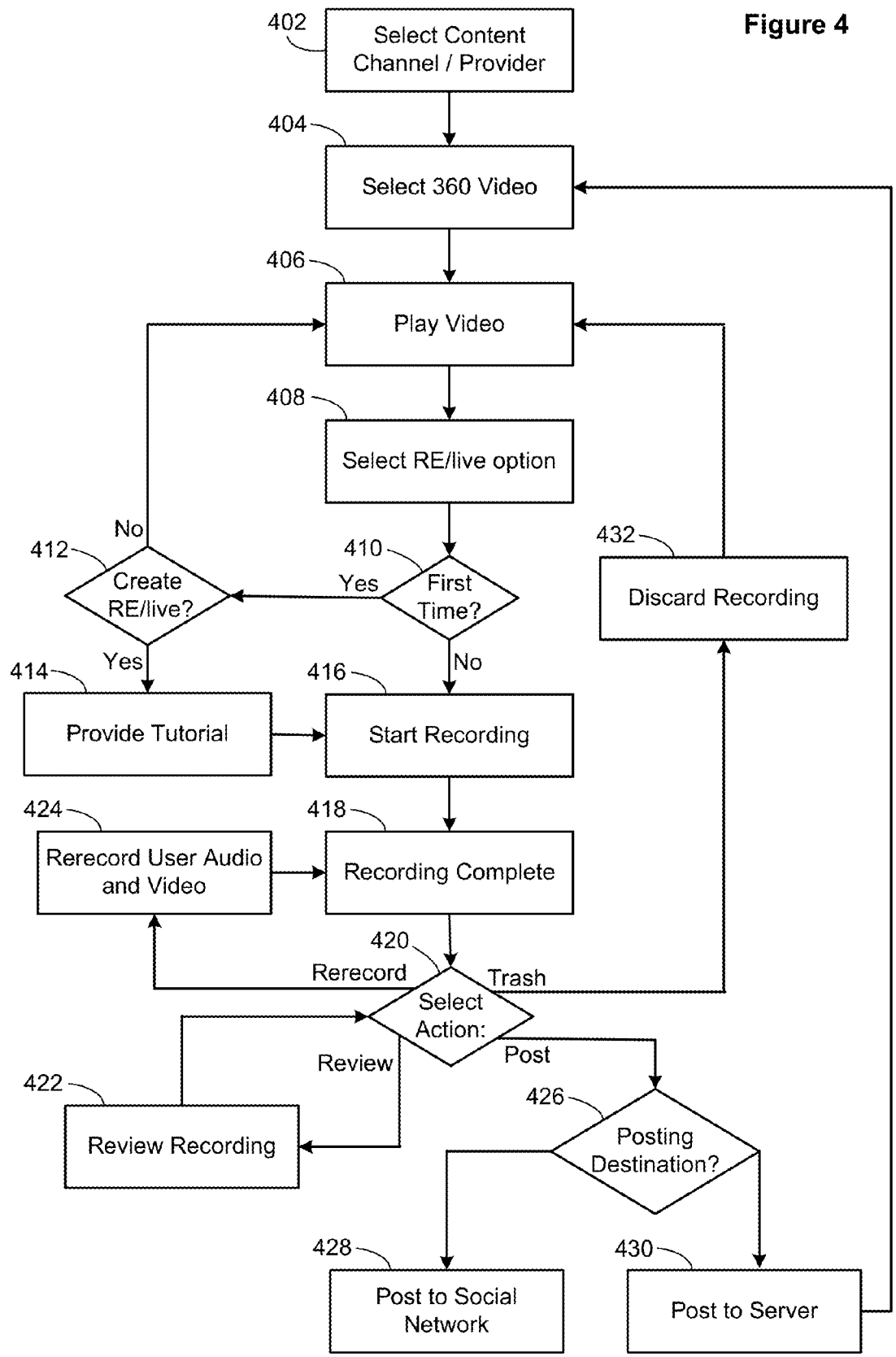

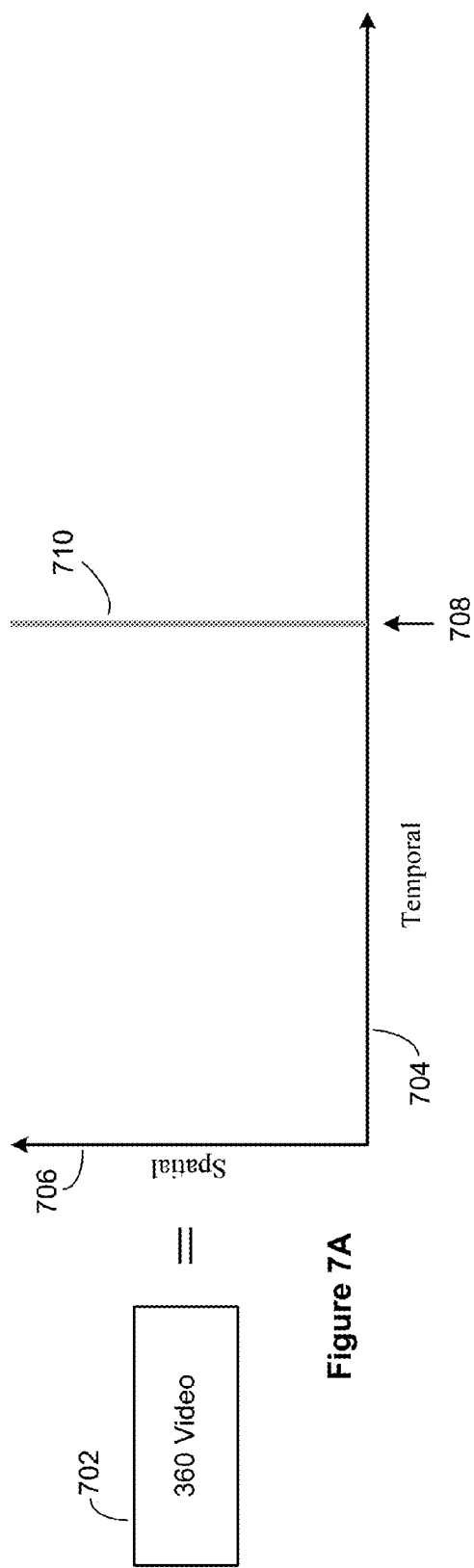
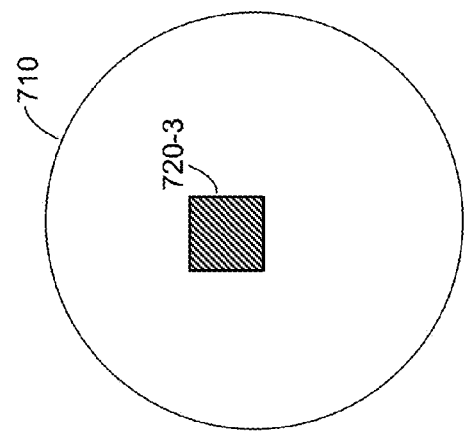
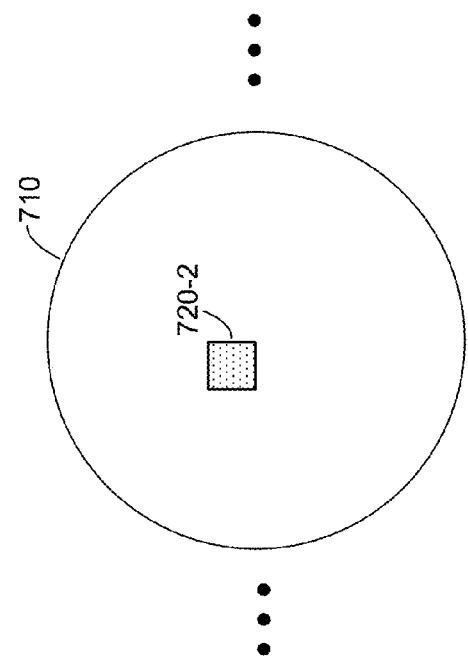

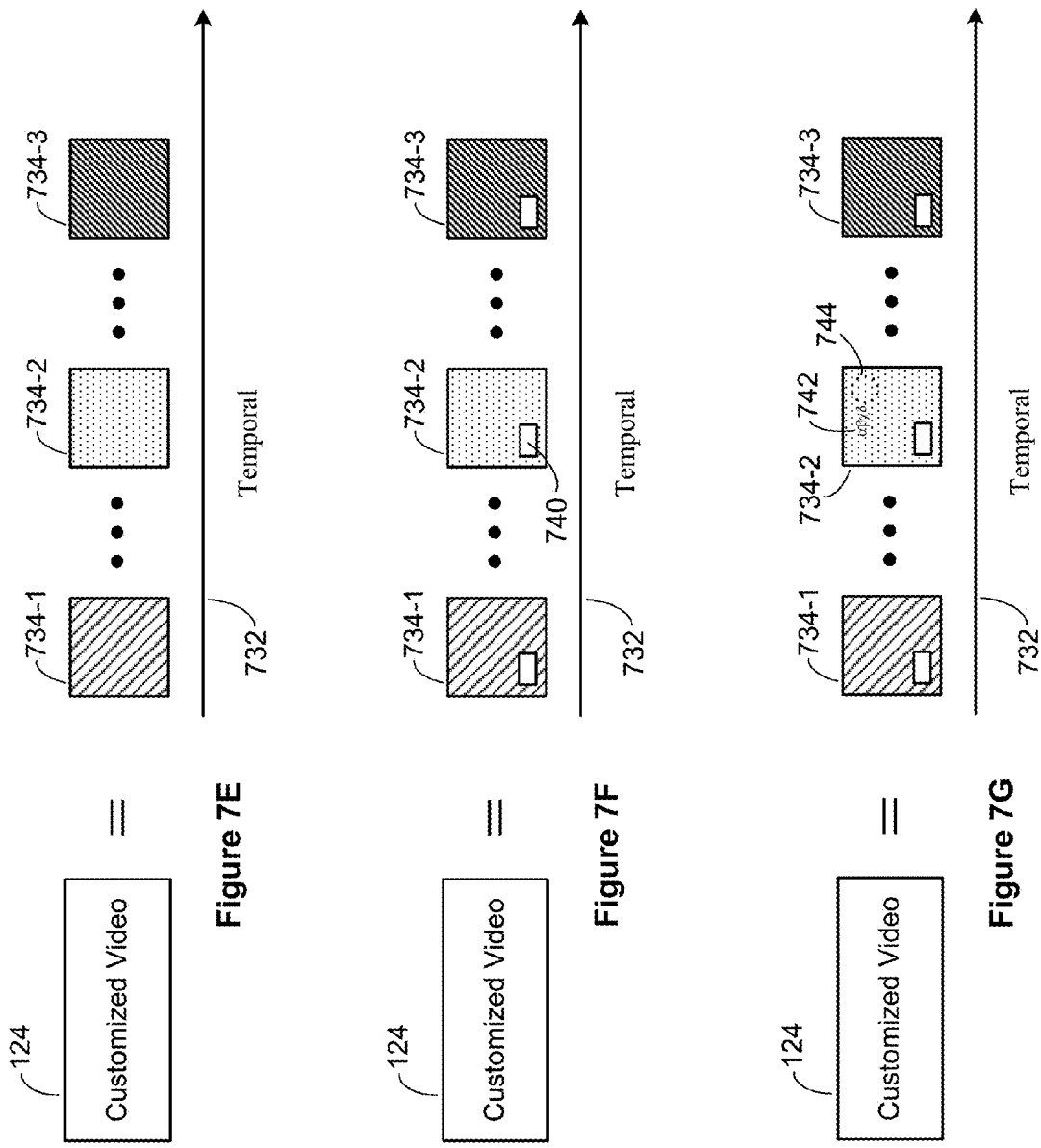

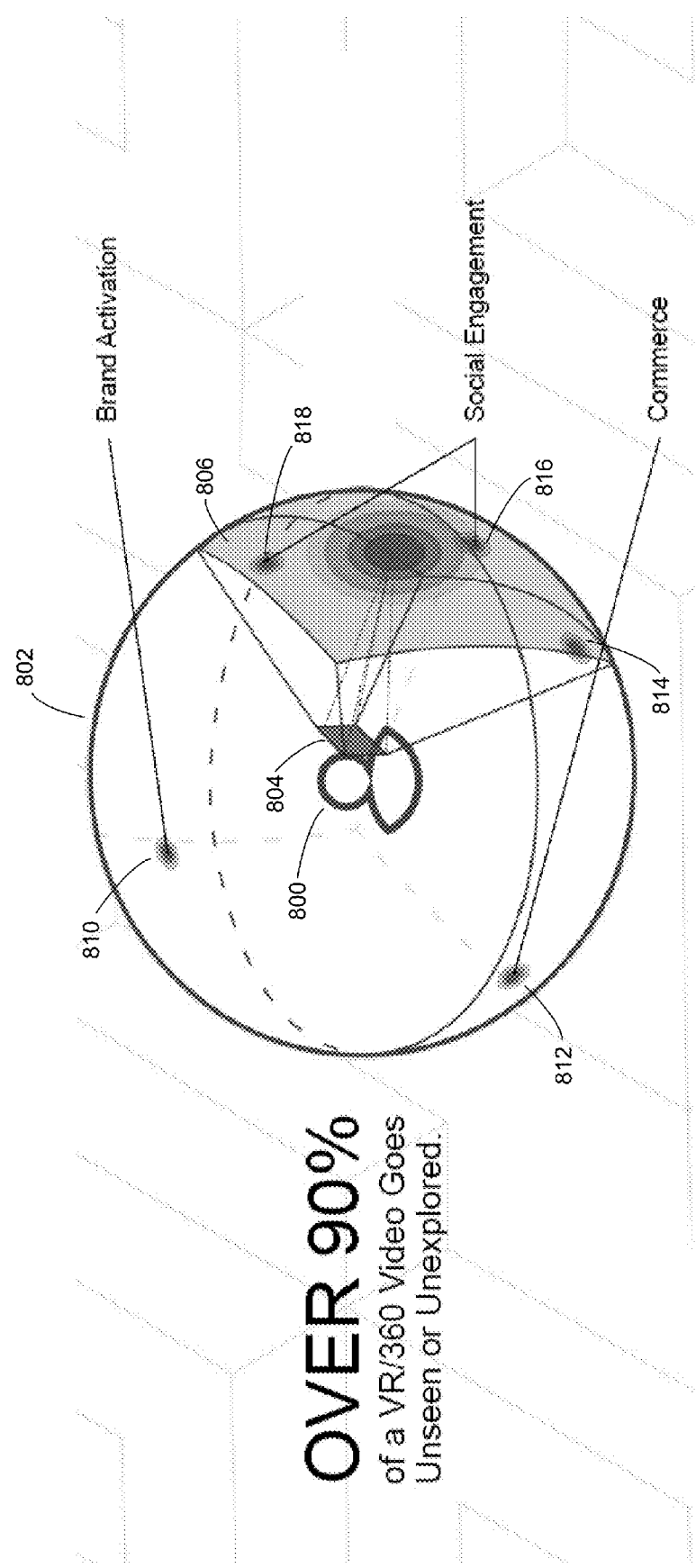

METHODS AND SYSTEMS FOR CUSTOMIZING IMMERSIVE MEDIA CONTENT

CROSS REFERENCE TO RELATED APPLICATIONS

This application is a continuation-in-part of U.S. patent application Ser. No. 15/217,961, filed Jul. 22, 2016, entitled "Methods and System for Customizing Immersive Media Content," which is incorporated by reference herein in its entirety.

TECHNICAL FIELD

The disclosed implementations relate generally to media content and more specifically to creating customized versions of media content to share with others.

BACKGROUND

Video content is widely available, both from commercial sources as well as non-commercial online sources that freely share the content with others. Users are typically passively engaged in the videos. In some instances, videos include an interactive component, but the interaction is limited. Some content providers are providing video that is more than a single flat screen. For example, 360 video provides surround video, with a user viewing a portion of what is available through a view window or portal. By altering the view window, a person can see different portions of the video while it is playing. However, even 360 video leads to superficially engaged users because users do not know what they should be looking for or where to look. In addition, there is a limited supply of good, interesting content that is accessible to users. Also, when viewing a 360 video, a user is limited to the visibility window. If there are two or more points of interest in the video, a user will only see one of them, which can limit the value of the video.

In addition to 360 video, some content providers create 360 photos. Like 360 video, a viewer of a 360 photo typically does not know where to look, and thus may not discover interesting aspects of the photo.

SUMMARY

Disclosed implementations provide a media platform that leverages immersive media content to develop next generation social engagement models. Immersive media content includes 360 video, 360 photos, virtual reality, augmented reality, and mixed reality content. Some immersive media formats are dynamic temporally, such as 360 video and much of the content for virtual reality, augmented reality, and mixed reality. Some immersive content, such as 360 photos have static content. Implementations address many different areas, including sports, entertainment, education, travel, journalism, and social impact. For example, a user can select a single frame (the "freeze frame") of a 360 video, then create a new video from the freeze frame by moving a visibility window around to view different portions of the freeze frame. The user can add audio and/or video commentary, or other annotations. In some implementations, the newly created video is saved as a looping animated GIF.

In accordance with some implementations, a process for customizing immersive media content is performed at a computing system having one or more processors, memory, a microphone, and an image sensor. The process displays an immersive media customization user interface, and plays a 360 video in a first region of the user interface. In response to a first user action, the process captures a freeze frame of the 360 video at a specific moment (i.e., a single frame, which is a 360 image). In response to a second user action, the process starts recording a customized video of the captured freeze frame in real time according to a dynamically adjustable visibility window of the captured freeze frame. The visibility window identifies what portion of the freeze frame is seen. During the recording, a user adjusts the visibility window to specify what portion of the captured freeze frame is recorded. The user can move the location of the visibility window and/or change the magnification of the visibility window. In some implementations, the user moves the visibility window by moving the computing device itself. In some implementations, the user moves the visibility window or changes the magnification of the visibility window using a mouse pointer, a finger gesture, a hand gesture, an arm gesture, or an eye gesture.

In response to a third user action, the process stops recording the customized video. The customized video is also annotated by the user. In some instances, the user annotates the customized video by adding a visual overlay in a peripheral portion of the customized video. The visual overlay is a recorded video of the user captured by the image sensor. In some instances, the user annotates the customized video by adding an audio overlay that is recorded audio captured using the microphone. In some instances, the user annotates the customized video by adding a visual annotation comprising text or an image. In some instances, a user adds multiple annotations to a single customized video. After the customized video is created, the process transmits the customized video to a second computing system (e.g., sending the customized video to a friend, colleague, or family member).

The annotations can be added to the customized video either while the customized video is being initially recorded (e.g., a user adds audio commentary while moving the visibility window), or added to the customized video after it is recorded (i.e., during playback).

In some implementations, the recorded audio captured using the microphone and recorded video captured by the image sensor are both captured while recording the customized video. Annotating the customized video includes synchronizing the video overlay with the customized video and synchronizing the audio overlay with the customized video.

In some implementations, after recording the customized video, the process plays the customized video. During playback, the process captures the recorded audio using the microphone and captures the recorded video using the image sensor. Adding the annotations to the customized video includes synchronizing the video overlay with the customized video and synchronizing the audio overlay with the customized video.

In some implementations, the customized video includes a frame-shaped portion of the captured freeze frame outside of the visibility window, where the frame-shaped portion of the captured freeze frame is displayed in an obfuscated manner. In some implementations, displaying in an obfuscated manner includes displaying the frame-shaped portion as dimmed or unfocused.

The customized video can be stored in various ways. In some implementations, the customized video is saved as a regular video (e.g., MPEG), so it includes only what was visible in the visibility window during recording (plus annotations). In other implementations, the customized video stores the captured freeze frame and metadata that defines placement and magnification of the visibility window within the captured freeze frame. In some implementations, this enables a person viewing the customized video to stray from the portion originally displayed in the visibility window during the recording.

In some implementations, the customized video includes a visual annotation that is added within the customized video for a specified interval of time that is less than the duration of the customized video. For example, the user can insert text or an image at a specific location and time during the recording (e.g., to point out or highlight an important aspect of the captured freeze frame).

In some implementations, the customized video includes a visual annotation that has a specified expiration date, thereby preventing display of the visual annotation during playback after the specified expiration date. For example, if there is an aspect of the captured freeze frame that relates to an upcoming real-world event, an annotation may be set to expire after occurrence of the real-world event.

In some implementations, annotating the customized video includes adding a pre-recorded audio track (e.g., music).

In accordance with some implementations, a process for customizing video content is performed at a computing system having one or more processors, memory, a microphone, and an image sensor. Typically, the computing system is a handheld portable device, such as a smartphone or a tablet computer. In some implementations, the computing system is a laptop computer, a VR computer system with a head-mounted display, a desktop computer, or other computer system. The process displays a 360 video customization user interface. After the user selects a 360 video from a content source (e.g., a content network), the process plays the 360 video in a first region of the user interface. In some implementations, the first region is essentially the entire screen of the computing system. The first region displays a portion of the 360 video according to a user selected visibility window. In a virtual sense, the 360 video is playing on a spherical screen surrounding the user. The visibility window defines what portion of the 360 video that the user actually sees. In some implementations, the user adjusts the visibility window by moving the computing device (e.g., using a gyroscope and/or an accelerometer in the computing system or GPS coordinates determined by the computing system). In alternative implementations, the user can adjust the visibility window using a mouse pointer or finger gesture.

While playing the 360 video, the process receives user input to adjust the visibility window and the process records information that identifies placement of the visibility window within the 360 video. The recording tracks exactly where the user's visibility window was positioned during viewing. In some implementations, placement includes information that specifies both location of the visibility window as well as the current zoom of the visibility window. In some implementations, placement includes only location of the visibility window.

In some instances, the process uses the microphone to record audio provided by the user and/or uses the image sensor to record video of the user (e.g., the image sensor is a forward-facing camera). In some implementations, using the microphone to record audio provided by the user and using the image sensor to record video of the user are both performed while playing the 360 video. In some implementations, recording the audio and video from the user is performed later. In some implementations, after playing the 360 video, the process replays the 360 video using the recorded information that identifies placement of the visibility window, thereby controlling placement of the visibility window during the replay. While replaying the 360 video in this way, the process uses the microphone to record audio provided by the user and uses the image sensor to record video of the user.

The process then uses the information that identifies placement of the visibility window to form a customized video that includes what was displayed in the visibility window while playing the 360 video. The customized video also includes at least one other form of customization, including a video overlay, an audio overlay, and/or a visual annotation.

In some instances, the customized video includes a visual overlay in a peripheral portion of the customized video, where the visual overlay shows the recorded video of the user. Typically, the visual overlay is a small box in an outer corner of the display, covering 5% or less of the main video.

In some instances, the process adds an audio overlay to the customized video, where the audio overlay includes the recorded audio. In some instances, the audio overlay replaces the existing soundtrack of the 360 video; in other instances, a combined audio soundtrack is created, with sound volumes mixed by the user.

When created, the audio overlay and visual overlay are typically synchronized with the 360 video so that the audio and video in the overlays correspond to what was being displayed to the user while the audio and video were recorded.

In some instances, the customized video includes one or more visual annotations. Annotations can include text (e.g., alphanumeric text or emoji) or graphics (e.g., a profile photo or other image). In some implementations, the user can place annotations anywhere within the customized video (spatially or temporally). In some implementations, the video application limits where annotations may be located.

After the customized video is created, the customization user interface typically gives the user the opportunity to review the video (e.g., play the customized video). In some implementations, the choices are to either discard the customized video or save it. In some implementations, the user can keep the main video (using the user's visibility window of the 360 video), and re-record the audio and/or video overlays. When the customized video is saved, the user is prompted to transmit the customized video to a second computing system (e.g., Facebook®, Twitter®, or other social network).

In some implementations, the customized video includes only the portion that was visible in the visibility window. In other implementations, the customized video includes a frame-shaped portion (like a picture frame) of video from the 360 video outside of the visibility window. This frame-shaped portion of video is displayed in an obfuscated manner, such as displaying the frame-shaped portion as dimmed, unfocused, blurred, or in greyscale rather than color.

Storage of the customized video can be in various forms depending on the implementation. In some implementations, the customized video consists of the original 360 video itself, plus metadata that specifies where the visibility window is at all times. When the customized video is played, the placement of the visibility window is controlled by the saved metadata. In some implementations, when a user watches a customized video, the visibility window is strictly controlled by the customization metadata. In other implementations, placement of the visibility window defaults to what is specified in the metadata, but can be overridden by the viewing person. In some implementations, overrides are temporary (e.g., lasting five or ten seconds), reverting back to what is specified in the metadata after the elapsed time. In other implementations, once a viewer chooses to override the position of the visibility window, the positioning is under viewer control thereafter.

In some implementations, the visibility window tracking metadata (or a portion thereof) is displayed in the customization user interface during playback. In some implementations, the displayed metadata is included with other data, such as usage and viewing area metrics.

In some implementations, the information that identifies placement of the visibility window includes both location and magnification. While a user is playing the 360 video, the user can make adjustments to the visibility window, which includes both location of the visibility window and magnification (or zoom) of the visibility window. The magnification for the visibility window operates like adjusting the zoom of a camera lens. The location and magnification are included in the recording so that on playback, the visibility window displays the same view that was seen during the recording.

In some implementations, a user can add a pre-recorded audio track to a customized video. For example, a user can add a music track. When audio tracks are added, implementations allow the user to mix the combination (e.g., specify the sound level for each audio component of the customized video). For example, the final sound track can include a combination of the original audio, an added music track, and commentary by the user.

In other implementations, forming the customized video includes extracting a video stream from the 360 video that includes only what was visible in the visibility window while playing the 360 video. In these implementations, there is effectively no visibility window during playback because the customized video has no video other than what is being displayed. In some of these implementations, the extracted video stream includes a frame-shaped video border, as described above.

In some implementations, the 360 video and/or the customized video are created in real-time as streams. For example, the 360 video may be for a live event (such as a football game). The streaming 360 video is received by a user at a computing system and is played at the computing system as it is received with minimal latency (e.g., within a few milliseconds). In some implementations, the formed customized video is created as a live stream as it is recorded and transmitted to a second computing system in real-time (e.g., with latency less than a few milliseconds). In some implementations, receiving a live feed (as a 360 video), playing the 360 video, recording the customized video, and transmitting the customized video as a live stream are all done at substantially the same time (e.g., within 10 milliseconds, within 50 milliseconds, or within 100 milliseconds).

Although these implementations have been described with respect to 360 video, the same techniques can be applied to other video formats as well. Some of the same techniques described herein can also be applied to 360 photos, virtual reality, augmented reality, and mixed reality content. For example, rather than a 360 video of an actual event, a virtual reality 360 video can be used. A user can determine a visibility window (e.g., by moving a head-mounted display), which is recorded and used in the same way as a 360 video of a real scene. This is true for augmented reality systems and mixed reality systems as well. In another example, the original video may be a partial panoramic video, and the visibility window in the user interface is used to specify what portion is being viewed. The same techniques can also be applied to videos that consist of a large flat image.

Some implementations apply similar techniques to still images as well, such as a 360 photo. In some implementations, a user navigates a visibility window around a 360 photo, and records audio and/or video to correlate with the movement. In this way, even though the original image is still, a recorded video is created based on the user's movement of the visibility window.

In some instances, the customized video includes a visual annotation that is added within the customized video for a specified interval of time that is less than the duration of the customized video. For example, a user may add a popup message at a specific point in the video to identify a particularly important event that is occurring or about to occur.

In some instances, the customized video includes a visual annotation that has a specified expiration date, thereby preventing display of the visual annotation during playback after the specified expiration date. For example, the visual annotation may be a limited time offer or an invitation to an upcoming event. For an upcoming event, the user can set the annotation to expire after the event occurs so that viewers of the video in the future do not see a notification for an event that has already occurred.

In some implementations, a computer system has one or more processors, memory, a microphone, and an image sensor. One or more programs are stored in the memory and configured for execution by the one or more processors. The one or more programs include instructions for performing any of the processes described herein.

In some implementations, a non-transitory computer readable storage medium stores one or more programs configured for execution by one or more processors of a computer system that has a microphone and an image sensor. The one or more programs include instructions for performing any of the processes described herein.

BRIEF DESCRIPTION OF THE DRAWINGS

FIG. 4 is a flow chart of a process for creating for creating a customized video in accordance with some implementations.

FIGS. 7A-7G illustrate a process of creating a customized video based on a 360 image in accordance with some implementations.

FIGS. 8A and 8B graphically illustrate using a visibility window for immersive media in accordance with some implementations.

Like reference numerals refer to corresponding parts throughout the drawings.

DESCRIPTION OF IMPLEMENTATIONS

Reference will now be made to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Disclosed implementations enable users to engage in immersive media content. Immersive media content includes 360 video, 360 photos, virtual reality, augmented reality, and mixed reality content, as well as other formats. Some immersive media formats are temporally dynamic, such as 360 video and much of the content for virtual reality, augmented reality, and mixed reality. Some immersive content, such as 360 photos have static content. Although many of the examples of dynamic immersive media are described with respect to 360 video, the same methodology applies to other forms of dynamic immersive media as well.

Figure 1:
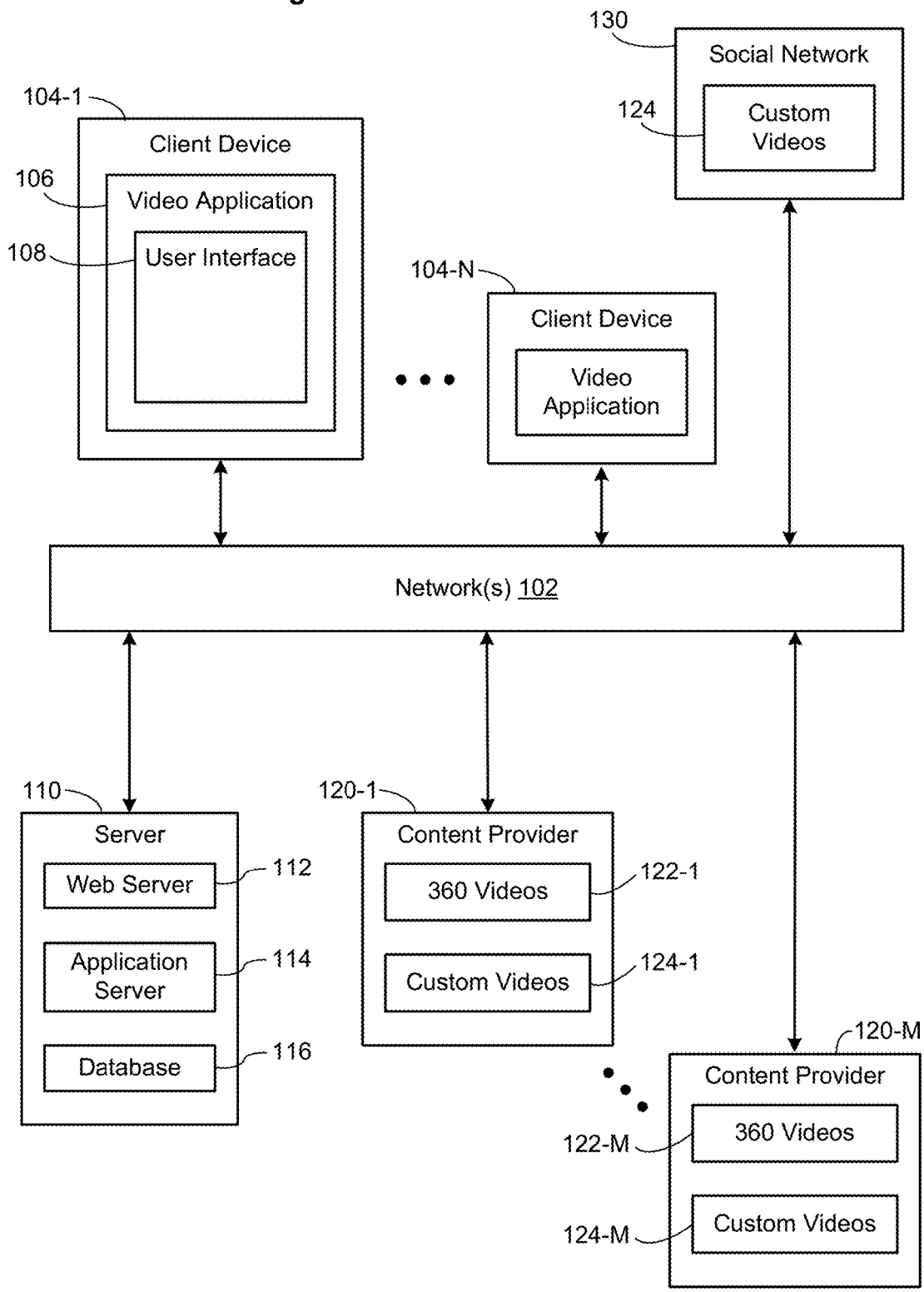
FIG. 1 is a block diagram of a context in which some implementations operate.

FIG. 1 illustrates a context in which some implementations operate. Content providers 120 (e.g., 120-1 to 120-M) store 360 videos 122 (e.g., videos 122-1 to 122-M). 360 videos are taken by a camera system to produce essentially a full spherical view from the location of the camera system. Typically, video images from multiple cameras are stitched together to create the full 360 video. A content provider 120 may store only a few 360 videos, but some content providers have hundreds or thousands of 360 videos. In some implementations, the 360 videos 122 at a content provider 120 all have the same type, but some content providers 120 store 360 videos with two or more distinct formats.

In addition, some content providers 120 store each customized video 124 that is created based on a 360 video 122 stored at the provider 120 (e.g., custom videos 124-1 to 124-M for content providers 120-1 to 120-M). The custom videos 124 are created by users of the video application 106. The content provider may provide the custom videos 124 to other users as well. In some instances, the user who creates the custom video 124 is a well-known person, such as a star football player or a well-known actress. Custom videos 124 created by famous people tend to have greater appeal for other users.

Many individual users access the video application 106 using a client device 104 (e.g., client devices 104-1 to 104-N). In some implementations, the client device is a handheld device, such as a smart phone or tablet computer, an augmented reality (AR) device, a virtual reality (VR) device (e.g., with a head mounted display), a laptop computer, or a desktop computer. The user interacts with the user interface 108 of the video application 106 to view existing 360 videos (e.g., provided by a content provider 120), and to create new customized videos 124 using an existing 360 video.

In some implementations, the video application 106 is provided by a server 110 (or cluster of servers 110). The server 110 includes a web server 112, an application server 114, and a database 116, which are described in more detail below with respect to FIG. 3. In some implementations, one or more of the content providers 120 include the functionality described with respect to the server 110.

The customized videos 124 that users create can also be uploaded to one or more social networks 130, such as Facebook® or Google+®. In some instances, this provides greater access to the customized videos because of the number of social network users.

All of the computer, servers, and computing devices illustrated in FIG. 1 communicate over one or more communication networks 102, such as the Internet, other wide area networks, local area networks, and so on. In many cases, a client device 104 communicates with other devices using a wireless network.

Figure 2:
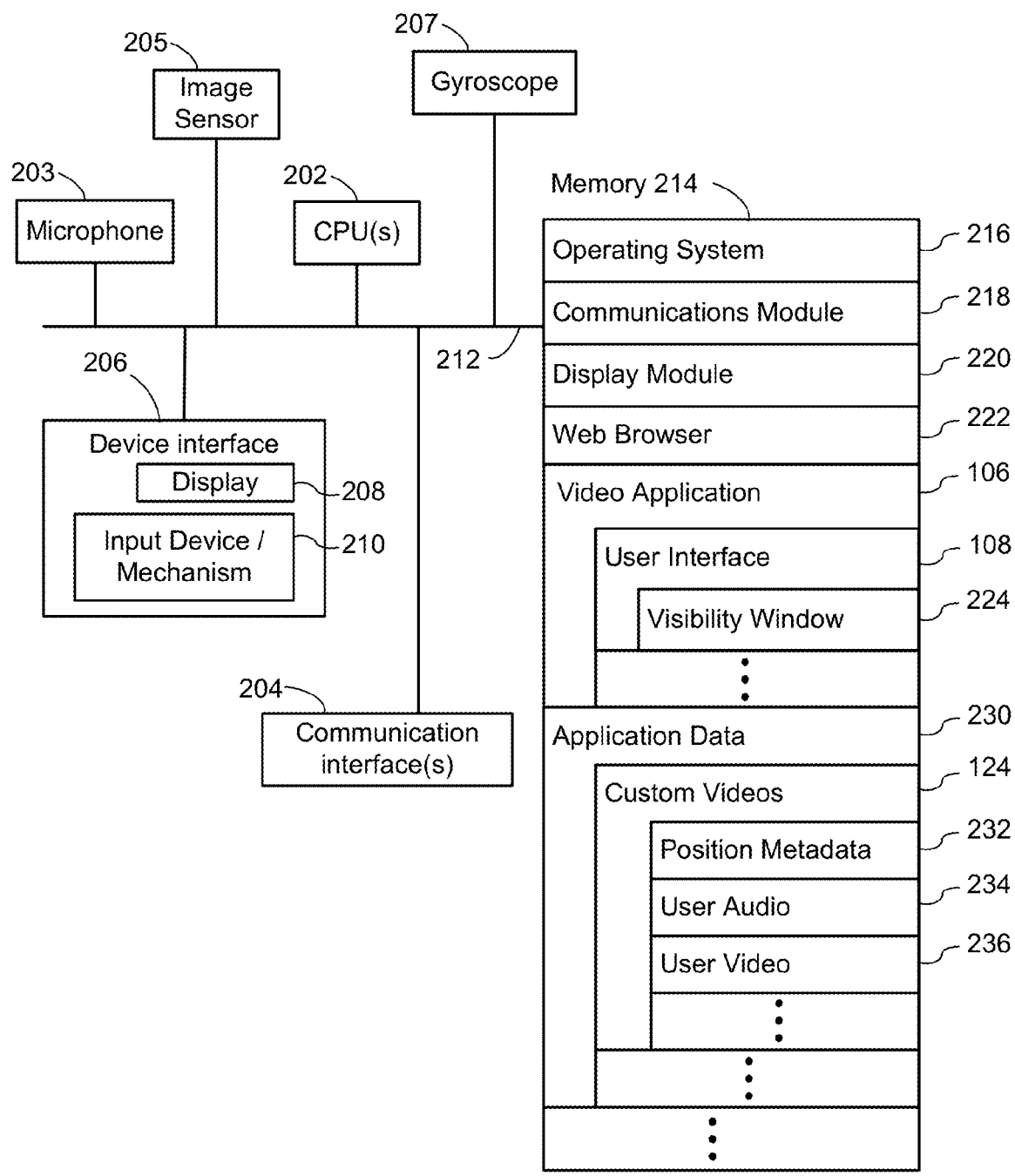
FIG. 2 is a block diagram of a client device in accordance with some implementations.

FIG. 2 is a block diagram illustrating a client device 104 that a user uses to access a video application 106. A client device is also referred to as a computing device or a computing system, which may be a smart phone, tablet computer, a laptop computer, a desktop computer, a PDA, or other computing device than can run the video application 106 and has access to a communication network 102. A client device 104 typically includes one or more processing units (CPUs) 202 for executing modules, programs, or instructions stored in the memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. A client device 104 includes a device interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

The client device 104 also includes a microphone 203 and one or more image sensors 205. Some client devices 104 have both a front-facing image sensor and a rear-facing image sensor. In some implementations, the client device 104 includes one or more gyroscopes 207, which can be used to identify movement of the client device 104. In some implementations, the client device 104 includes other sensors, such as an accelerometer and/or a magnetometer, which further enable detection of motion and device orientation. Some client devices 104 include a GPS antenna and a GPS processing module (e.g., a chip), which can be used to determine the approximate geographic location of the client device 104.

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

an operating system 216, which includes procedures for handling various basic system services and for performing hardware dependent tasks;

a communications module 218, which is used for connecting the client device 104 to other computers and devices via the one or more communication network interfaces 204 (wired or wireless) and one or more communication networks 102, such as the Internet, other wide area networks, local area networks, metropolitan area networks, and so on;

a display module 220, which receives input from the one or more input devices or mechanisms 210, and generates user interface elements for display on the display device 208;

a web browser 222, which enables a user to communicate over a network 102 (such as the Internet) with remote computers or devices;

a video application 106, which enables users to select and view 360 videos 122 as well as create customized versions 124 of the existing 360 videos 122. Some examples of the user interface 108 are illustrated in the figures below. When playing a 360 video, the user interface typically operates in a mode where all or a majority of the display screen 208 is used to display the video. When playing a 360 video, the user specifies a visibility window 224, which determines what portion of the 360 video appears on the display screen 208. Typically, the visibility window is determined by the movement and orientation of the client device 104 (e.g., panning the client device to the left moves the visibility window proportionately to the left); and application data 230, which includes data used and/or created by the video application 106. In some implementations, the application data 230 include various profile information about the user, a log of videos viewed or created by the user, user preference data, and so on. In addition, the application data includes custom videos 124 created by the user. In some implementations, the data for a custom video 124 includes position metadata 232, which specifies the location of the visibility window at each point in time. The data for a custom video also include user audio data 234 (e.g., user commentary while the 360 video is playing) as well as video data 236 (e.g., video of the user, such as the user's face, while creating the custom video 124). The user audio 234 and user video 236 may be captured at the same time the position metadata 232 is captured (e.g., the first playing of the 360 video), or may be created later (e.g., while replaying a created custom video 124.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 may store a subset of the modules and data structures identified above. Furthermore, the memory 214 may store additional modules or data structures not described above.

Although FIG. 2 shows a client device 104, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
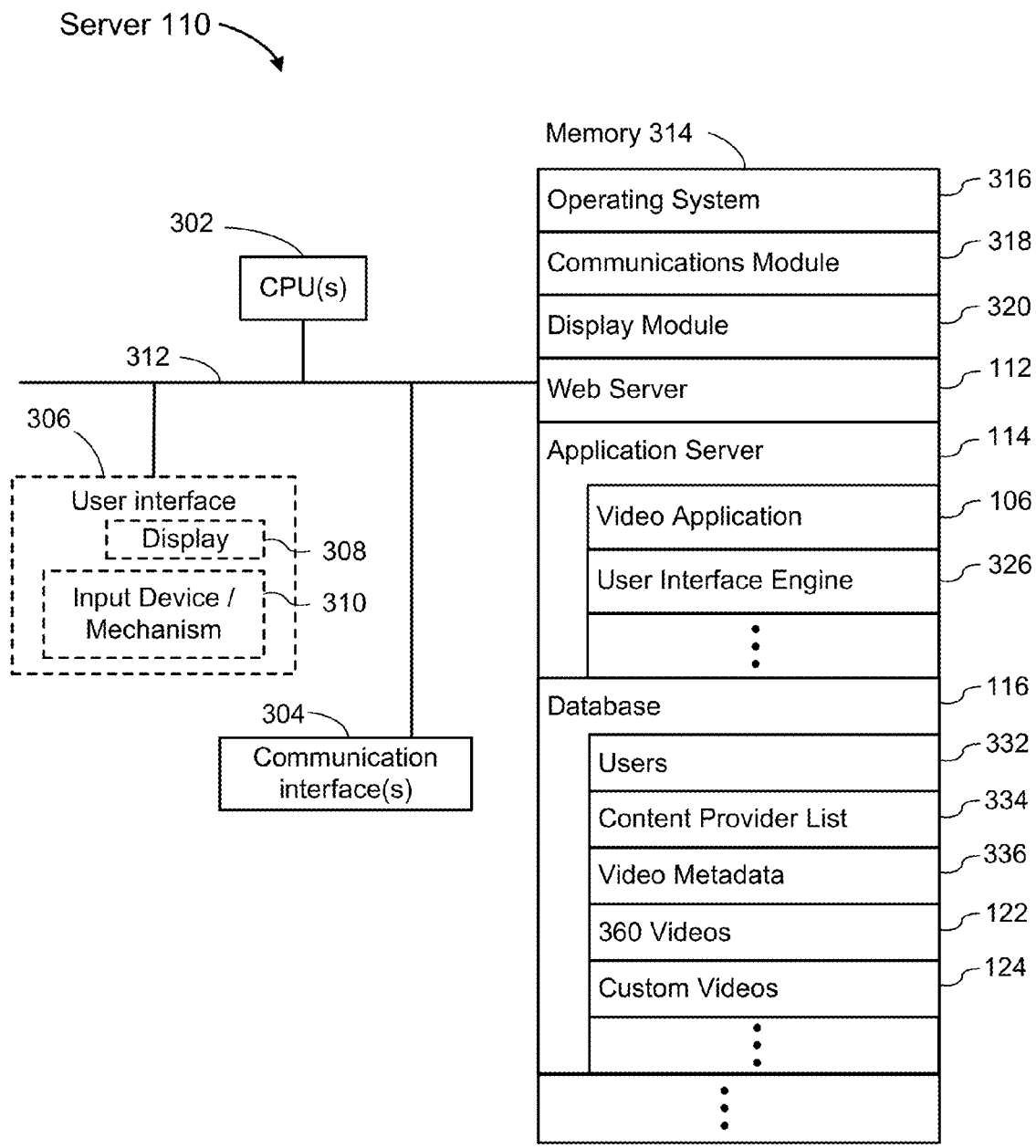
FIG. 3 is a block diagram of a server in accordance with some implementations.

FIG. 3 is a block diagram illustrating a server 110. In some implementations, a server 110 is one of a plurality of servers in a server system. A server 110 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. In some implementations, a server 110 includes a user interface 306, which may include a display device 308 and one or more input devices 310, such as a keyboard and a mouse.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within the memory 314, comprises a non-transitory computer readable storage medium. In some implementations, the memory 314, or the computer readable storage medium of the memory 314, stores the following programs, modules, and data structures, or a subset thereof:

an operating system 316, which includes procedures for handling various basic system services and for performing hardware dependent tasks;

a communications module 318, which is used for connecting the server 110 to other computers via the one or more communication network interfaces 304 (wired or wireless) and one or more communication networks 102, such as the Internet, other wide area networks, local area networks, metropolitan area networks, and so on;

a display module 320, which receives input from one or more input devices 310, and generates user interface elements for display on a display device 308;

one or more web servers 112, which receive requests from a client device 104, and return responsive web pages, resources, or links. In some implementations, each request is logged in the database 116;

one or more application servers 114, which provide various applications (such as a video application 106) to the client devices 104. In some instances, applications are provided as a set of web pages, which are delivered to the client devices 104 and displayed in a web browser 222. The web pages are delivered as needed or requested. In some instances, an application is delivered to a client device 104 as a download, which is installed and run from the client device 104 outside of a web browser 222;

some implementations include a user interface engine 326, which provides the user interface 108 for users of the video application 106; and one or more databases 116, which store various data used by the modules or programs identified above. In some implementations, the database 116 includes a list of authorized users 332, which may include user names, encrypted passwords, and other relevant information about each user. The database 116 also stores a content provider list 334, which provides information about known content providers (e.g., web addresses). In addition to the list of content providers 334, some implementations store video metadata 336, which identifies what 360 videos are available from the content providers 334, and descriptive information about those videos. Some implementations query each content provider dynamically to determine what videos are available. In some implementations, the database 116 stores copies of the 360 videos 122 (or some of the videos). One advantage of storing copies of the 360 videos is that they are available even if a content provider is offline. In some implementations, the server 110 can also provider better access due to server hardware performance, network bandwidth, or other factors. In some implementation, the server also stores the custom videos 124 created by users.

Each of the above identified elements in FIG. 3 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 illustrates a server 110, FIG. 3 is intended more as functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

As illustrated in FIGS. 2 and 3, the functionality for a video application may be shared between a client device 104 and a server system 110. In some implementations, after the video application 106 is installed on a client device 104, the majority of the subsequent processing occurs on the client device 104, interacting directly with content providers 120. In other implementations, the majority of the processing and data storage occurs at a server 110, and the client device 104 uses a web browser 222 to view and interact with the data. In this case, a client device interacts with the server 110, and the server 110 interacts with the content providers 120. One of skill in the art recognizes that various allocations of functionality between the client device 104 and the server 110 are possible, and some implementations support multiple configurations (e.g., based on user preferences).

FIG. 4 is a flow chart of a process for creating a customized video in accordance with some implementations. The customized video is sometimes referred to as a RE/live. The process starts by selecting (402) a channel or content provider 122. After a channel is selected, the user interface 108 displays a list of available 360 videos from the selected channel or provider, and the user selects (404) one of the available videos. Note that in some implementations, the user is provided a mixture of 360 videos from a variety of providers 120 (e.g., the most popular videos and/or the most relevant videos for the particular user).

The user then chooses to play (406) the video. In some implementations, the user subsequently chooses to start (408) a RE/live recording. In some implementations, the user can start the RE/live recording at the same time as selecting to play the video.

In some implementations, the video application 106 determines (410) whether this is the first time that the user has made a RE/live recording. If so, the user interface 108 checks whether (412) the user intended to create a RE/live recording. If not, the video application resumes playing (406) the video without recording. If this is the user's first RE/live, and that is what the user actually intended, the video application 106 provides (414) a tutorial of how to use this feature. After the tutorial, or immediately after selecting the RE/live option if this is not the user's first recording, the video application begins (416) recording. Recording includes tracking the location of the visibility window (i.e., what portion of the 360 is the user viewing at each point in time). In some implementations, the recording also includes simultaneously recording a video of the user and recording audio (e.g., the user's commentary about the 360 video). The recording stops (418) either when the 360 video is over or when the user chooses to stop the recording. The duration of the RE/live 124 created can be less than the duration of the original 360 video.

Once the recording is complete, the user has various options (420). One of the options is to review (422) the recording. Reviewing the recording includes playing back the RE/live as created, using the visibility window that was created during the recording. In addition, the review includes the audio and video from the user. The recorded video of the user is generally overlaid in a corner position of the main video created from the 360 video. In some implementations, the video overlay is about 4% or 5% of the total area of the main video, and displayed as a rectangular region in the lower left periphery of the main video. The audio recording of the user (or the ambient sound) can be added to or replace the audio from the original 360 video. After the review, the user is presented with the same set of options (420). In some implementations, the review option is automatically selected after the original recording is complete.

Another option is to rerecord (424) the user's audio and video. When this option is selected, the main video is played based on the visibility window positions originally recorded, and the user is given another opportunity to make comments (or act, etc.). When the rerecording (424) is complete (418), the action options (420) are presented again. In some implementations, no user audio or video recording occurs during the original recording (416), so the "rerecord" option may have a different label that identifies this as an option for recording user commentary. Some implementations also provide an option to discard (or not create) either the user audio or the user video.

Another option is to discard (432) the recording entirely. In this case, the default behavior is to return the user to the point where the user can replay the same recording (or select a different video).

An important aspect of custom videos 124 is that they can be shared with others. If a user likes a custom video that was created, the user can choose to post the custom video 124 for others. In some implementations, the user is presented with multiple destination options (426). One of the options is to post the custom video 124 to a social network 130, such as Facebook® or Google+®. Another option is to post to the server 110, making the custom video available to other users of the application. In some implementations, the custom video 124 is also saved to the corresponding content provider 120. In some implementations, posting to the content provider 120 is a user-selectable option. In some implementations, posting to the content provider occurs implicitly when the user chooses to post the custom video. In some implementations, the user also has the option to save the custom video locally on the client device 104. In this case, the user has the option to post the custom video to the server 110 or a social network 130 later.

Figure 5A:
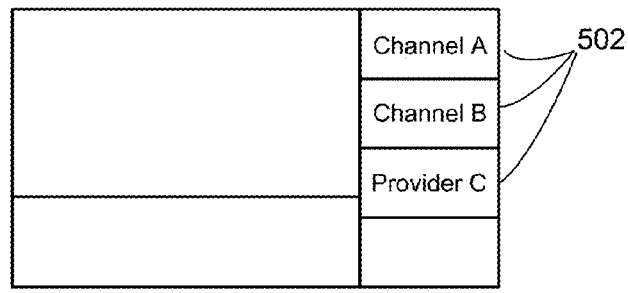
FIGS. 5A-5E provide an outline of user interface elements for creating a customized video in accordance with some implementations.

FIGS. 5A-5E provide an outline of user interface elements for creating a customized video in accordance with some implementations. In FIG. 5A, the user interface 108 displays several channels or content providers 502, and the user selects one of the providers to download a specific 360 video.

Figure 5B:
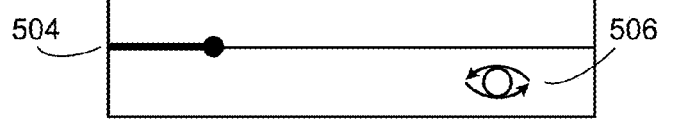
Figure 5C:

In FIG. 5B, the 360 video starts playing. The progress bar 504 shows how much of the 360 video has already played. In addition, the user interface 108 displays a RE/live icon 506. The user selects the RE/live icon 506 to initiate recording, which is shown in FIG. 5C. In FIG. 5C, the Active RE/live icon 508 is shown in the video area, indicating that recording is active. In addition, the front-facing image sensor 205 on the client device 104 begins recording video of the user, which is shown in the inlay 510. The ambient audio also begins recording.

Figure 5D:
Figure 5E:
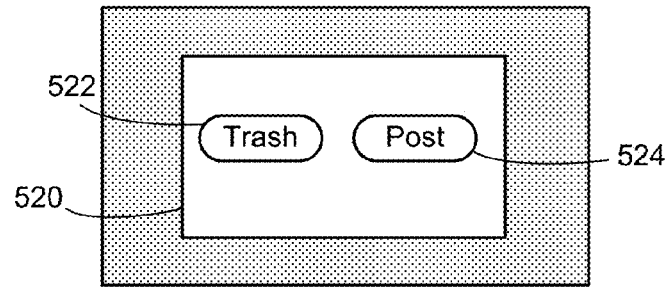

At some point, either the 360 video completes or the user stops the recording. In some implementations, the user can stop the recording by tapping anywhere within the video area. In other implementations, the user can stop the recording by tapping the Active RE/live icon 508. As shown in FIG. 5D, the user has tapped (512) on the screen to stop the recording. In some implementations, after the recording stops, the video application automatically replays the video for user review. In other implementations, the user can also choose to review (e.g., review more than one time).

After the user reviews the recorded custom video 124, the user interface 108 displays several options 520 for the user. if the user selects the discard option 522, the custom video 124 is deleted. If the user selects the post option 524, the user can select where to post the custom video, such as on the server 110 or on a social network 130. In some implementations, choosing to post the custom video also saves the custom video to the channel or provider 120 that created the original 360 video. In some implementations, the channel or provider 120 has a separate custom video feed that can be selected by users. In some implementations, when a custom video 124 is posted to the server, it becomes visible to other users who are followers of the user who created the new custom video.

Figure 6A:
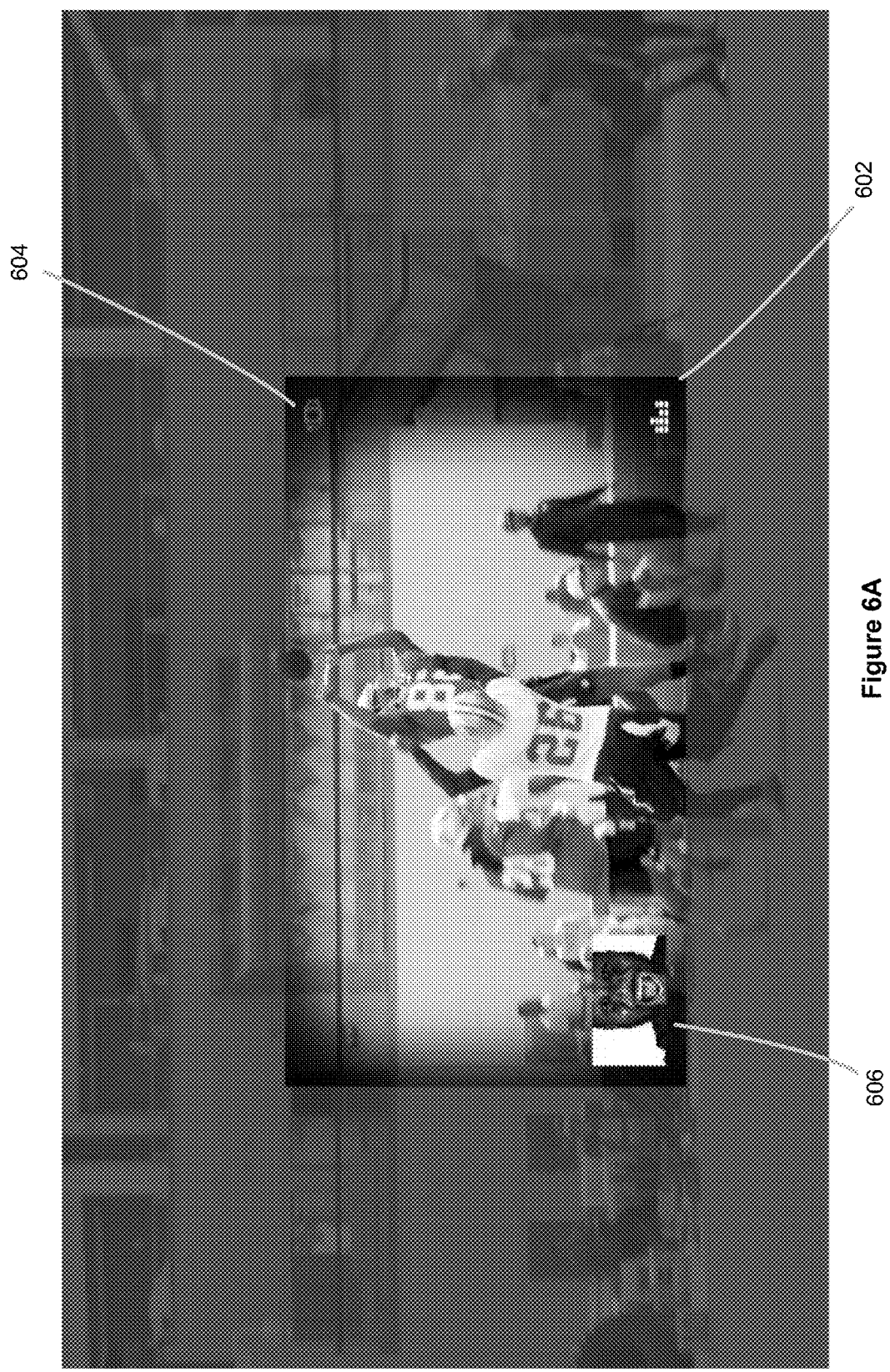
FIGS. 6A-6D illustrate recording and playing back a customized video in accordance with some implementations.
Figure 6B:

FIGS. 6A-6D illustrate recording and playing back a customized video in accordance with some implementations. FIG. 6A illustrates that the visibility window selects a portion 602 of the 360 video. The portion inside the visibility will be displayed during playback. During recording, the Active RE/live icon 604 is displayed so that the user knows the recording is active. During recording, the user also sees the video overlay 606 that is being simultaneously recorded. FIG. 6B is the same as FIG. 6A, but shows just what is inside the visibility window. This is what the user sees while making the recording.

Figure 6C:
Figure 6D:

FIG. 6C shows playing back the custom video 124 that was recorded in FIG. 6A or 6B. The playback has the same primary video and the same video overlay in the corner of the image. In addition, during playback the audio track includes the audio recorded by the user. In this implementation, a recorded customized video displays a different icon 620 to indicate that it is a saved custom video.

In some implementations, a user is able to move the visibility window during playback, so the image is obfuscated outside the recorded field of view and the video application guides users back to the reference point if they stray away. This is illustrated by the obfuscated region 630 in FIG. 6D. Some implementations use audio cues in addition to (or instead of) visual cues to guide the user back to the reference point (e.g., by accentuating the sounds originating from the reference point in the custom video).

Figure 6E:
FIGS. 6E and 6F illustrate adding annotations to a customized video in accordance with some implementations.

In FIG. 6E, a user has added a comment annotation 640 to the bottom of the customized video. In this example, the annotation includes both a text portion ("Dude check this out!") as well as a graphic portion (a profile photo of the user making the comment). The timeline 642 indicates that the annotation comment appears at 47 seconds into the customized video. This comment may be displayed for a limited duration in the video, such as from 0:47 to 1:00 in the video (i.e., for 13 seconds, beginning 47 seconds into the video).

Figure 6F:
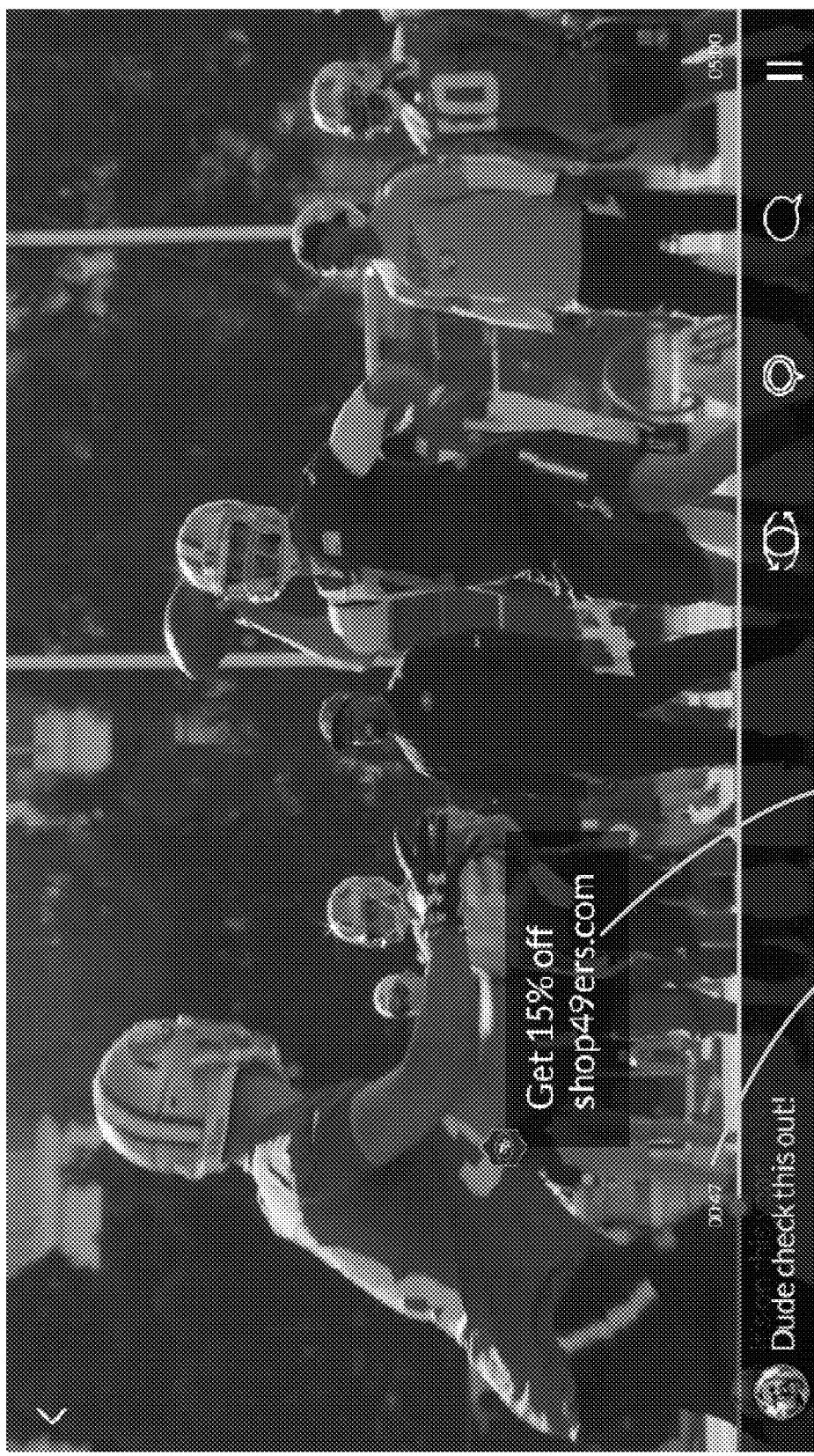

In FIG. 6F, a user has added an advertisement annotation 650 as well. In some implementations, the user can choose where the annotation 650 is displayed. Although not shown, the advertisement annotation 650 may have an associated expiration date, such as 30 days from creation of the video. If an expiration date is specified, the annotation will not appear in the video after the specified date. In some implementations, certain annotations are associated with a specific location in the 360 video, so the annotation is displayed only if that location is in user's view during playback.

Some implementations use the following sequence of operations to add annotations. First, the user pauses the video. In some implementations, a user can insert an annotation at a specific location by tapping and holding on a place within the video. Alternatively, some implementations provide an annotation button in the user interface. In some implementations, when either of these events occurs, a soft keyboard appears, allowing the user to type a short annotation. If the annotation was initiated by tapping at a specific location, the annotation appears at that location. If the user used an annotation button, some implementations position the annotation in the center of the video and prompt the user to drag the annotation to a desired location. Some implementations prompt the user to actively save or cancel the annotation insertion. At this point, the video resumes playing (or replaying).

In some implementations, text annotations have a limit on the number of characters (e.g., 30 characters or 50 characters).

In some implementations, annotations appear as small dots within the video. As a user pans into the general area of an annotation within the video (e.g., using a mouse cursor or finger gesture), annotations in that area are displayed. When there are multiple annotations, the video user interface scrolls through them one at a time, in the video bar, along with a profile picture of the person who made the annotation.

In some implementations, visibility of annotations is limited based on social network connections. For example, a user can specify which users they follow. In this case, a user sees only the annotations of people that the user follows. In some implementations, certain annotations by specific individuals (e.g., celebrities) are displayed for everyone. In some implementations, users can specify that they do not want to see any annotations.

Figure 8B:
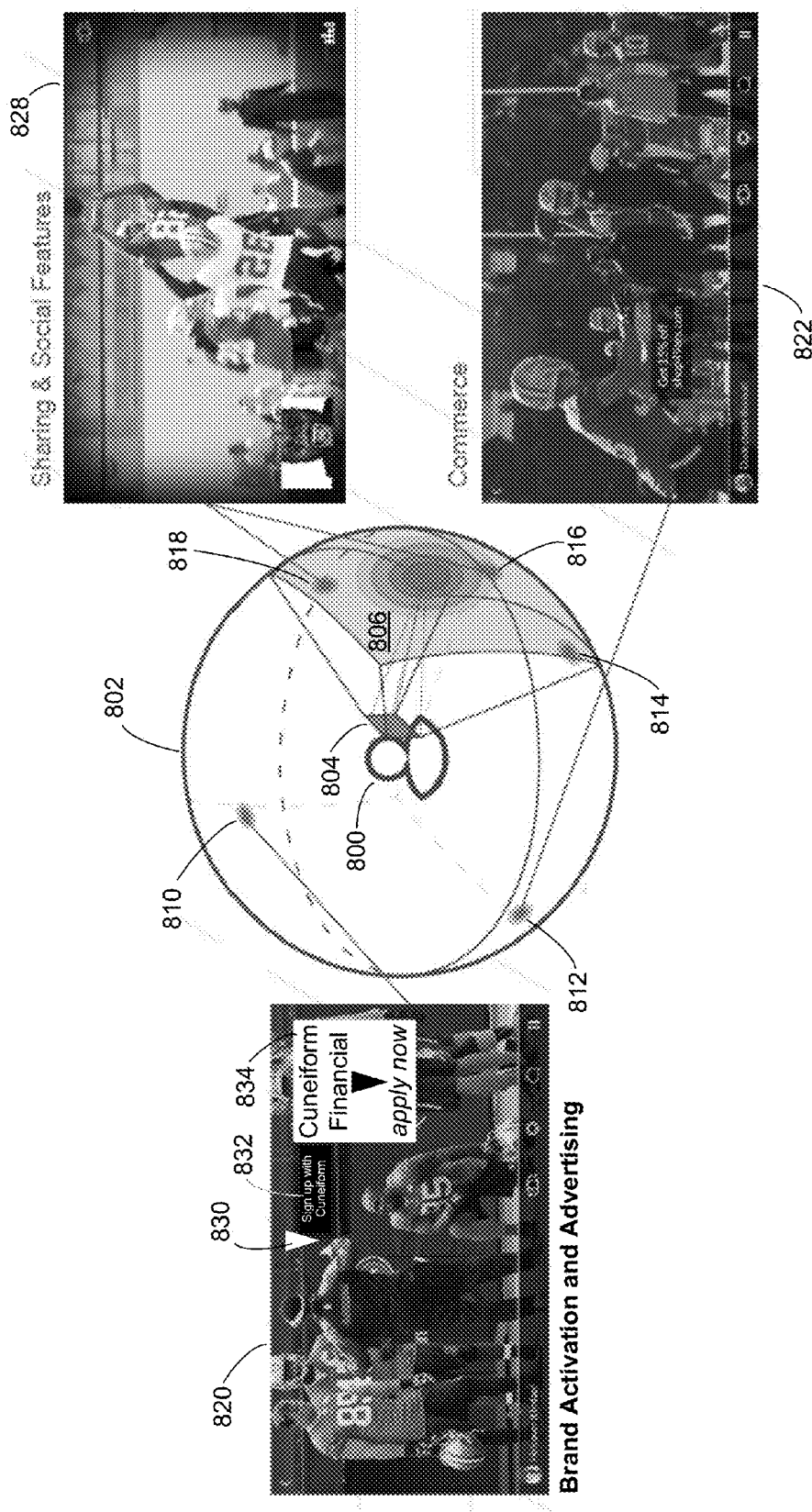

FIGS. 7A-7G illustrate a process of creating a customized video based on a 360 image in accordance with some implementations. FIG. 7A illustrates that a 360 video 702 has both a temporal dimension 704 and a spatial dimension 706. The spatial aspect of a 360 video is more than a single dimension, as illustrated in FIGS. 8A and 8B below, but is displayed in FIG. 7A as a single dimension for simplicity. At a specific point in time 708, the user takes an action (e.g., pressing a real or virtual button) to capture a freeze frame 710. The freeze frame 710 is a single 360 image. As illustrated in FIG. 7A, the freeze frame 710 has no temporal dimension, but has the full spatial dimensionality (i.e., a 360 degree view).

The user then initiates creation of a custom video 124 based on the freeze frame 710. The recorded video is based on the location of the visibility window. In FIG. 7B, the visibility window is at a first location 720-1 within the freeze frame 710. In FIG. 7B, the freeze frame 710 is illustrated as a circle to better illustrate the dimensionality, and demonstrates that the visibility window sees only a portion 720-1 of the freeze frame. Typically, the custom video 124 is recorded in real-time as the user manipulates the visibility window. If the freeze frame 710 is considered as a spherical image (as illustrated in FIGS. 8A and 8B), the visibility window acts like a video camera, taking a movie of the portion in the window.

FIG. 7C illustrates that the visibility window has been moved to see a second portion 720-2 of the freeze frame 710. Unless the recording is paused by the user, the recording captures the movement of the visibility window in real-time, creating a continuous video ranging from the first location 720-1 to the second location 720-2. In addition to adjusting the location of the visibility window as shown in FIGS. 7B and 7C, the user can change the magnification, as illustrated in FIG. 7D. The third position 720-3 of the visibility window is about the same as the second position 720-2, but the magnification has changed so that the visibility window sees a larger portion of the freeze frame 710. Again, unless the video recording is paused, the entire transition from the second position 720-2 (and associated magnification) to the third position 720-3 (and its magnification) is recorded as part of the custom video 124.

As illustrated in FIG. 7E, the customized video 124 is the recording illustrated in FIGS. 7B, 7C, and 7D. In particular, the customized video 124 includes a first video frame 734-1 captured when the visibility windows was at the first location 720-1, a second video frame 734-2 captured at the second location 720-2, and a third video frame 734-3 captured at the third position 720-3 (with the associated magnifications at each position). Of course the custom video 124 also include many more video frames in between the illustrated three positions in FIGS. 7B, 7C, and 7D (e.g., thousands of frames). Although the freeze frame 710 is a single image, recording a video based on the user's view of the freeze frame creates a temporal dimension 732.

After a custom video 124 is created, a user can annotate the video in several ways, as illustrated in FIGS. 7F and 7G. In FIG. 7F, the user has added a video annotation 740, which appears in each frame of the custom video 124. In some instances, the video annotation is a recording of commentary by the user, which generally includes audio. In some implementations, the video annotation is created during playback of the custom video 124. For example, after recording the custom video 124 (as illustrated in FIG. 7B-7D), the user plays back the recording and records the video annotation (e.g., using a front-facing image sensor in a mobile device) and records the commentary. Typically, the video annotation is created by the same user that created the customized video 124, but it is not required. For example, some implementations enable a user on one device to create the customized video 124, and send the customized video 124 to a second person for customization. Although FIG. 7F illustrates adding a video annotation to an entire customized video 124, some implementations enable a user to add video annotations to selected portions of a customized video 124. Although not illustrated in FIG. 7F, some implementations enable a user to add a soundtrack to a customized video 124 without a visual track. For example, a user may add audio commentary only or add a pre-recorded soundtrack (e.g., music). Some implementations allow a user to add multiple soundtracks, which may overlap (e.g., commentary and music).

When video or audio annotation is used, the video or sound tracks are synchronized with the customized video 124. E.g., the user's commentary is saved so that it aligns with exactly the same points in the customized video 124 when subsequently played with the annotations.

FIG. 7G illustrates that a user can also add static text 742 and/or static images 744 at specific points in a customized video. The static text 742 and/or static image 744 can be positioned both temporally (what span of time) and spatially (where within the video image). In the example of FIG. 7G, the text 742 has be placed near the top in the middle, and the image 744 has been placed in the upper right of the video. Both of these annotations are present in the frame 734-2, but are not present at the beginning or end of the customized video 124. Static text and images can be placed for any length of time in the customized video 124 (e.g., from half a second up to the entire video).

Although the techniques of FIGS. 7A-7G have been illustrated with respect to a 360 video, the same techniques can be applied more broadly. For example, these techniques can be applied to a dynamic VR world, where the user captures a scene, and then proceeds to create a video with annotations from the captured scene as illustrated in FIGS. 7B-7G. As another example, a user can take an existing 360 photo and apply the techniques of FIGS. 7B-7G to create a customized video.

In some implementations, the customized video 124 is recorded at the same time the annotations (or some of the annotations) are added. For example, a user may begin recording of a customized video and create the audio/video commentary at the same time. Some implementations allow both simultaneous creation of the annotations and post-recording annotations. For example, a user may record commentary while creating the video, then decide to redo the commentary. Implementations typically allow users to delete and/or replace annotations.

FIGS. 8A and 8B illustrate how a visibility window is used. In these figures, a user 800 is shown in the middle of a spherical image or video 802. The same illustration applies regardless of whether the sphere 802 represents a single static 360 photo/image or a 360 video that changes from frame to frame. The user has a visibility window 804 (e.g., a region on the screen of a mobile device), which determines the portion 806 of the image/video 802 that is seen. As shown in FIG. 8A, the portion seen 806 is a small portion of the overall image/video 802. The user can move the visibility window and can change the magnification.

FIG. 8A includes some points 814, 816, and 818 that are visible to the user, but other points 810 and 812 are not visible to the user based on the current position of the visibility window 804. As illustrated in FIG. 8B, the points 816 and 818 correspond to social engagement (e.g., showing an important play in a sports game 828). However, there are many other locations (both spatially and temporally) that can be used in other ways according to some implementations. For example, a location 812 can trigger a commercial offer, such as getting 15% off purchases at a specific website as illustrated in the image 822 displayed at the location 812. In some implementations, such commercial offers are triggered when the user's visibility window is pointing in the right location at the right time. In some implementations, such offers are saved to an account associated with the user.

FIG. 8B also illustrates a space/time location 810 that is used for brand activation and advertising, as shown in the image 820 at the location 810. Here, the location 810 includes a symbol 830 and one or more advertisements 832 and 834 that appear for the user when the user's visibility window is in the right place at the right time. In some implementations, an advertisement 832 or 834, or a symbol 830 can link to a website.

More generally, a creator of immersive media content can place a "gem" at any location (spatially and temporally), and specify a reward for finding the gem. Gems include promo codes, links, a key to unlock a next video in a series, and so on. In many cases, a gem has a corresponding graphic icon or image. An identifier of the gem (such as the graphic icon or a textual label) is then associated with the user's account (e.g., in an electronic wallet). The user can redeem the rewards later.

By allowing users to explore more of the content and share their experiences, both users and content creators benefit. Users get a better experience and unique sharing features. Content creators get their audience to explore their content by having users replay the same video, thus creating more commerce and advertising potential.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for customizing immersive media content, comprising:
at a computing device having one or more processors, memory, a microphone, and an image sensor:
displaying an immersive media customization user interface;
playing a 360 video in a first region of the user interface;
in response to a first user action, capturing a freeze frame of the 360 video at a specific moment;
in response to a second user action, beginning recording of a customized video of the captured freeze frame in real time according to a dynamically adjustable visibility window of the captured freeze frame;
while recording the customized video, receiving user input to adjust the visibility window;
in response to a third user action, ending recording of the customized video;
annotating the customized video, including one or more of:
(a) adding a visual overlay in a peripheral portion of the customized video, wherein the visual overlay comprises a recorded video of the user captured by the image sensor;
(b) adding an audio overlay that comprises recorded audio captured using the microphone; and
(c) adding a visual annotation comprising text or an image;
transmitting the customized video to a second computing device.

2. The method of claim 1, wherein annotating the customized video includes two or more of:
(a) adding a visual overlay in a peripheral portion of the customized video, wherein the visual overlay comprises a recorded video of the user captured by the image sensor;
(b) adding an audio overlay that comprises recorded audio captured using the microphone; and
(c) adding a visual annotation comprising text or an image.

3. The method of claim 2, wherein annotating the customized video includes:
(a) adding a visual overlay in a peripheral portion of the customized video, wherein the visual overlay comprises a recorded video of the user captured by the image sensor; and
(b) adding an audio overlay that comprises recorded audio captured using the microphone.

4. The method of claim 3, wherein:
the recorded audio captured using the microphone and recorded video captured by the image sensor are both captured while recording the customized video; and
annotating the customized video comprises synchronizing the video overlay with the customized video and synchronizing the audio overlay with the customized video.

5. The method of claim 3, further comprising after recording the customized video, playing the customized video, wherein:
the recorded audio captured using the microphone and recorded video captured by the image sensor are both captured while playing the customized video; and
annotating the customized video comprises synchronizing the video overlay with the customized video and synchronizing the audio overlay with the customized video.

6. The method of claim 1, wherein the user input to adjust the visibility window comprises moving the computing device.

7. The method of claim 1, wherein the user input to adjust the visibility window comprises using a mouse pointer, finger gesture, hand gesture, arm gesture, or eye gesture.

8. The method of claim 1, wherein the user input to adjust the visibility window includes changing magnification of the visibility window.

9. The method of claim 1, wherein the user input to adjust the visibility window includes moving the visibility window.

10. The method of claim 1, wherein the customized video includes a frame-shaped portion of the captured freeze frame outside of the visibility window, wherein the frame-shaped portion of the captured freeze frame is displayed in an obfuscated manner.

11. The method of claim 1, wherein displaying in an obfuscated manner comprises displaying the frame-shaped portion as dimmed or unfocused.

12. The method of claim 1, wherein the customized video comprises the captured freeze frame and metadata that defines placement and magnification of the visibility window within the captured freeze frame.

13. The method of claim 1, wherein the customized video comprises a video stream from the captured freeze frame that includes only what was visible in the visibility window while playing the customized video.

14. The method of claim 1, wherein the customized video includes a visual annotation that is added within the customized video for a specified interval of time that is less than the duration of the customized video.

15. The method of claim 1, wherein the customized video includes a visual annotation that has a specified expiration date, thereby preventing display of the visual annotation during playback after the specified expiration date.

16. The method of claim 1, wherein annotating the customized video further comprises adding a pre-recorded audio track.

17. A computer system, comprising:
one or more processors;
memory;
a microphone;
an image sensor; and
one or more programs stored in the memory, configured for execution by the one or more processors, wherein the one or more programs include instructions for:
displaying an immersive media customization user interface;
playing a 360 video in a first region of the user interface;
in response to a first user action, capturing a freeze frame of the 360 video at a specific moment;
in response to a second user action, beginning recording of a customized video of the captured freeze frame in real time according to a dynamically adjustable visibility window of the captured freeze frame;
while recording the customized video, receiving user input to adjust the visibility window;
in response to a third user action, ending recording of the customized video;
annotating the customized video, including one or more of:
(a) adding a visual overlay in a peripheral portion of the customized video, wherein the visual overlay comprises a recorded video of the user captured by the image sensor;
(b) adding an audio overlay that comprises recorded audio captured using the microphone; and
(c) adding a visual annotation comprising text or an image;
transmitting the customized video to a second computer system.

18. The computer system of claim 17, wherein annotating the customized video includes two or more of:
(a) adding a visual overlay in a peripheral portion of the customized video, wherein the visual overlay comprises a recorded video of the user captured by the image sensor;
(b) adding an audio overlay that comprises recorded audio captured using the microphone; and
(c) adding a visual annotation comprising text or an image.

19. The computer system of claim 18, wherein annotating the customized video includes:
(a) adding a visual overlay in a peripheral portion of the customized video, wherein the visual overlay comprises a recorded video of the user captured by the image sensor; and
(b) adding an audio overlay that comprises recorded audio captured using the microphone;
wherein:
the recorded audio captured using the microphone and recorded video captured by the image sensor are both captured while recording the customized video; and
annotating the customized video comprises synchronizing the video overlay with the customized video and synchronizing the audio overlay with the customized video.

20. A non-transitory computer readable storage medium storing one or more programs configured for execution by one or more processors of a computer system that has a microphone and an image sensor, the one or more programs comprising instructions for:
displaying an immersive media customization user interface;
playing a 360 video in a first region of the user interface;
in response to a first user action, capturing a freeze frame of the 360 video at a specific moment;
in response to a second user action, beginning recording of a customized video of the captured freeze frame in real time according to a dynamically adjustable visibility window of the captured freeze frame;
while recording the customized video, receiving user input to adjust the visibility window;
in response to a third user action, ending recording of the customized video;
annotating the customized video, including one or more of:
(a) adding a visual overlay in a peripheral portion of the customized video, wherein the visual overlay comprises a recorded video of the user captured by the image sensor;
(b) adding an audio overlay that comprises recorded audio captured using the microphone; and
(c) adding a visual annotation comprising text or an image;
transmitting the customized video to a second computer system.

* * * * *